US010285087B2

(12) United States Patent
Song

(10) Patent No.: US 10,285,087 B2
(45) Date of Patent: May 7, 2019

(54) EFFICIENT EVENT-TRIGGERED REPORTING SYSTEM

(71) Applicant: Honeywell International Inc., Morris Plains, NJ (US)

(72) Inventor: Jane Song, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/348,241

(22) Filed: Nov. 10, 2016

(65) Prior Publication Data
US 2018/0132123 A1 May 10, 2018

(51) Int. Cl.
H04W 24/00 (2009.01)
H04W 24/10 (2009.01)
H04W 4/04 (2009.01)
G08G 5/00 (2006.01)
H04W 28/14 (2009.01)
H04W 88/08 (2009.01)

(52) U.S. Cl.
CPC .......... H04W 24/10 (2013.01); G08G 5/0013 (2013.01); G08G 5/0021 (2013.01); G08G 5/0091 (2013.01); H04W 4/046 (2013.01); H04W 28/14 (2013.01); H04W 88/08 (2013.01)

(58) Field of Classification Search
CPC ............. H04B 7/18506; G08G 5/0004; G08G 5/0013; G07C 5/008
USPC ............................. 455/431, 456.1; 701/33.4
See application file for complete search history.

(56) References Cited

U.S. PATENT DOCUMENTS 7,132,974 B1 11/2006 Christianson
7,433,651 B2 10/2008 Rekimoto et al.
(Continued)

FOREIGN PATENT DOCUMENTS

EP 2608188 A1 6/2013
EP 2991044 A1 3/2016

OTHER PUBLICATIONS

Meymaris, In situ Turbulence Reporting for the Wind-Based Algorithm, National Center for Atmospheric Research, Feb. 26, 2013 (19 Pages).

(Continued)

Primary Examiner — Ping Y Hsieh
(74) Attorney, Agent, or Firm — Bookoff McAndrews, PLLC

(57) ABSTRACT

A method of reporting events is provided. The method includes setting at least one defined threshold that warrants an event-generated report associated with sensor data from at least one sensor. An associated event-generated report is generated upon detection of sensor data from the at least one sensor reaching the at least one defined threshold. The event-generated report is stored in a buffer. A summary indicator signal is generated upon detection of a predetermined summary signal condition. The method further includes transmitting the summary indicator signal to a remote location. The summary indicator signal includes information indicating at least the number and types of event-triggered reports that are then currently stored in the buffer. Upon receiving a remote request in response to the summary indicator signal, the method further includes transmitting only those event-triggered reports stored in the buffer requested in the remote request.

20 Claims, 4 Drawing Sheets

(56) References Cited

U.S. PATENT DOCUMENTS

| | | |
|---|---|---|
| 8,666,748 B2 | 3/2014 | Dong et al. |
| 2005/0233739 A1* | 10/2005 | Forbes .................. G07C 5/008 |
| | | 455/431 |
| 2012/0191273 A1* | 7/2012 | Jacobs ............... H04B 7/18508 |
| | | 701/3 |
| 2013/0158991 A1* | 6/2013 | Dong .................. G08G 5/0013 |
| | | 704/235 |
| 2015/0030481 A1 | 1/2015 | Sugiyama et al. |
| 2015/0304813 A1 | 10/2015 | Esposito et al. |
| 2016/0196696 A1* | 7/2016 | Pereira .................. G07C 5/008 |
| | | 701/31.4 |

OTHER PUBLICATIONS

European Patent Office, "Extended European Search Report for EP Application No. 17199609.3", "Foreign Counterpart to U.S. Appl. No. 15/348,241", dated Apr. 11, 2018, pp. 1-12, Published in: EP.

* cited by examiner

EFFICIENT EVENT-TRIGGERED REPORTING SYSTEM

BACKGROUND

Data gathered by vehicles, such as airborne vehicles, may be used by base stations, such as ground stations, for such things as helping generate advisories to other vehicles in the area regarding weather events and the like and determining the health and performance of the vehicle. An example of data being communicated to a ground station from an aircraft includes turbulence reports. These reports may be used to forecast anticipated turbulence for subsequent aircraft traveling in the general area. If communication costs were not an obstacle the atmospheric turbulence reports and other types of reports could be downlinked after every measurement. However, there are communication cost associated with every message sent between an aircraft and a ground station. The communication costs include bandwidth usage/occupation costs as well as communication fees. Hence, there is a downside to transmitting reports after every measurement.

For the reasons stated above and for other reasons stated below which will become apparent to those skilled in the art upon reading and understanding the present specification, there is a need in the art for an efficient method of downlinking gathered data from a vehicle to a base station in a communication cost effective manner.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

The embodiments of the present invention provide methods and systems to communicate event-triggered reports to a remote location in a communication cost efficient manner.

In one example embodiment a method of reporting events is provided. The method includes setting at least one defined threshold that warrants an event-generated report associated with sensor data from at least one sensor. The sensor data from the at least one sensor is monitored. Upon detection of sensor data from the at least one sensor reaching the at least one defined threshold, generating an associated event-generated report. The event-generated report is then stored in a buffer. A summary indicator signal is generated upon detection of a predetermined summary signal condition. The method further includes transmitting a summary indicator signal to a remote location. The summary indicator signal includes information indicating at least the number and types of event-triggered reports that are then currently stored in the buffer. Upon receiving a remote request in response to the summary indicator signal, the method further includes transmitting only those event-triggered reports stored in the buffer requested in the remote request.

In another example embodiment, a method of communicating event-triggered information is provided. The method includes monitoring for events with a vehicle. An event-triggered report is generated when a predefined event condition is monitored. The event triggered report is stored in a buffer of the vehicle. A summary indicator signal is transmitted from the vehicle to a base station in this method. The summary indicator signal indicates at least the number and types of event-triggered reports that are then currently stored in the buffer. A request signal is received from the base station to transmit at least one select event-triggered report stored in the buffer of the vehicle. In response to the request signal, transmitting the at least one select event-triggered report stored in the buffer of the vehicle to the base station.

In still another example embodiment, an event-triggered vehicle reporting system is provided. The event-triggered vehicle reporting system includes a memory, at least one sensor, a communication system and a controller. The memory is used at least in part for storing operating instructions. The memory further includes a buffer. The controller is in communication with the at least one sensor, buffer and communication system. The controller is configured to execute the operating instructions to generate event-triggered reports based on sensed data from the at least one sensor. The controller is further configured to store each generated event-triggered report in the buffer of the memory. The controller is further configured to generate a summary indicator signal that includes at least the number and types of event-triggered reports that are then currently stored in the buffer and cause the communication system to transmit the summary indicator signal to a remote location.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
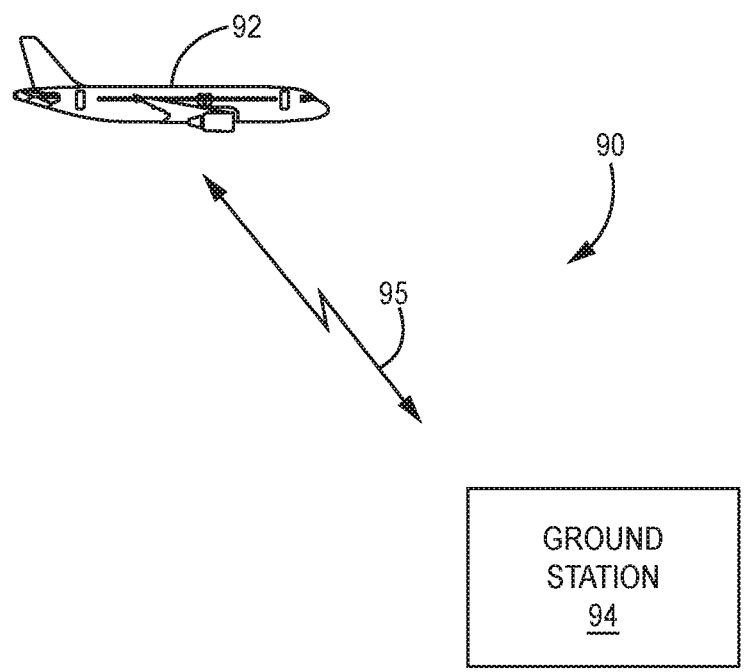
FIG. 1 is an illustration of a vehicle communicating with a base station of one embodiment of the present invention.

Embodiments of the present invention provide an effective communication system that provides a base station, such as but not limited to, a ground station, a summary of information stored in a buffer of a vehicle, such as but not limited to, an aircraft. The base station can then review the event detected summary and request select information described in the summary that the base station needs. This communication system limits the amount of information to be transmitted to only information needed by the base station. Referring to FIG. 1, a communication system 90 of an embodiment that includes an aircraft 92 and a ground station 94 is illustrated. As illustrated, communication signals 95 can be transmitted between the aircraft 92 and the ground station 94. Although, FIG. 1 illustrates the use of an aircraft 92, in this example embodiment, any type of vehicle could be used. Moreover, any type of communication system needing to send information to a remote location, such as a base station, could implement the techniques described herein to reduce communication costs.

Figure 2:
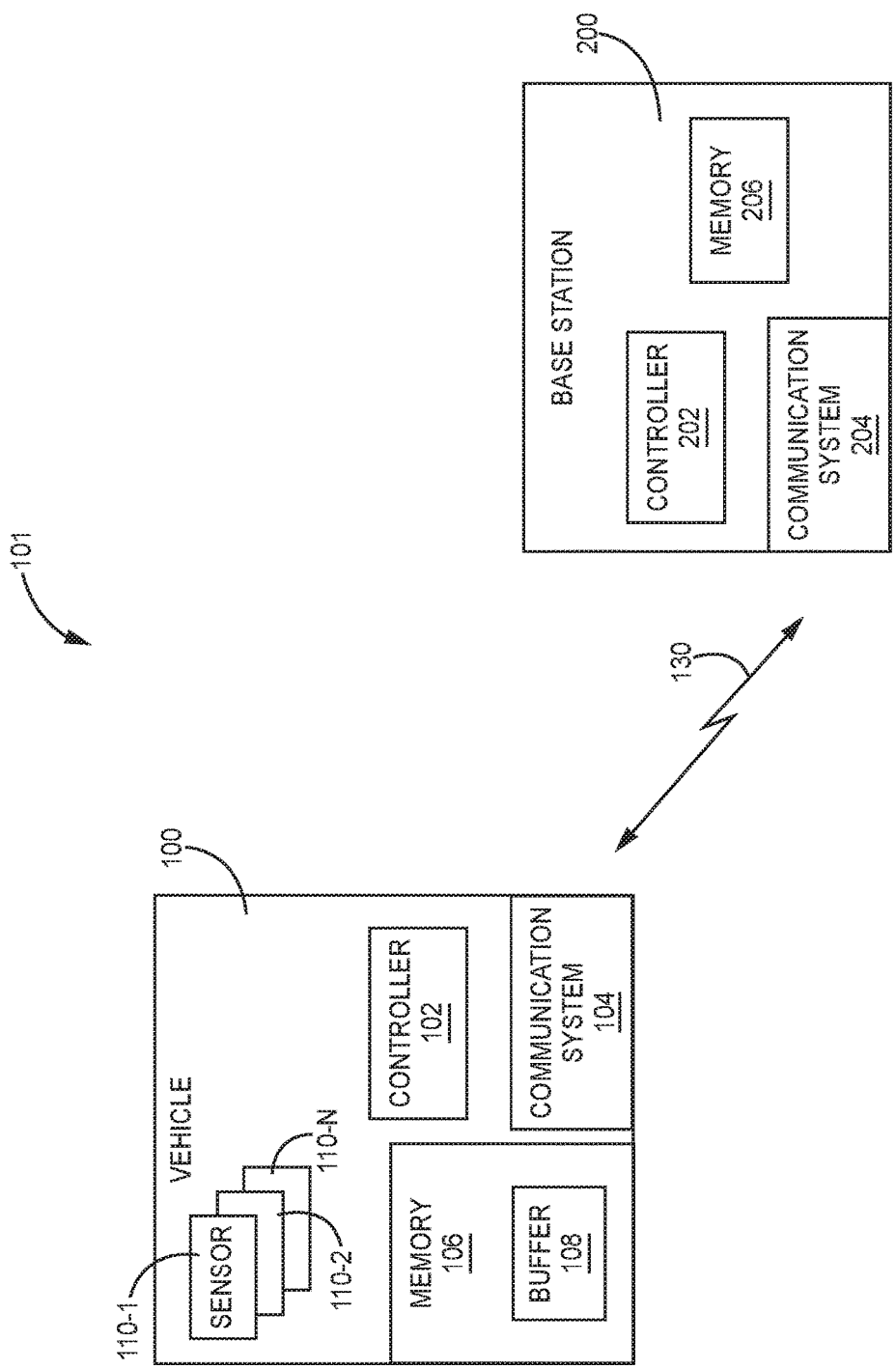
FIG. 2 is a block diagram of the vehicle communication with the base station of one embodiment of the present invention.

FIG. 2 illustrates a block diagram of a communication system 101 of an embodiment. The communication system 101 in this embodiment include a vehicle 100 and a base station 200. In this example embodiment, the vehicle 100 includes a vehicle controller 102, a vehicle communication system 104, a vehicle memory 106 and a plurality of sensors 110-1 through 110-N. The vehicle controller 102 is configured to control the gathering, storing and processing of the data from the sensors 110-1 through 110-N as well as to control the vehicle communication system 104. Sensors 110-1 through 110-N can include any type of sensor used to gather information of the conditions around the vehicles as well as conditions of the vehicle. For example, the sensors 110-1 through 110-N may include, but are not limited to, turbulence sensors such as Light Detection and Ranging (LIDAR) sensors, weather sensors such as a weather radar, pressure sensors, voltage sensors, current sensors, temperature sensors, operating sensors including speed sensors and rpm sensors, noise sensors, vibration sensors, optical sensors, image sensors, global positioning sensors etc. The vehicle controller 102 is in communication with the memory to at least store data and implement instructions stored in the memory 106. In general, the controller 102 (processor) may include any one or more of a microprocessor, a digital signal processor (DSP), an application specific integrated circuit (ASIC), a field program gate array (FPGA), or equivalent discrete or integrated logic circuitry. In some example embodiments, controller 102 may include multiple components, such as any combination of one or more microprocessors, one or more controllers, one or more DSPs, one or more ASICs, one or more FPGAs, as well as other discrete or integrated logic circuitry. The functions attributed to controller 102 herein may be embodied as software, firmware, hardware or any combination thereof. Memory 106 may include computer-readable instructions that, when executed by controller 102 provide functions of the vehicle 100. Such functions may include the functions of the communication system 104. The computer readable instructions may be encoded within the memory 110. Memory 110 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The base station 200 in this embodiment includes a base controller 202, base memory 206 and a base communication system 204. Similar to controller 102 discussed above, the base station controller 202 may include one or more processors. The base station communication system 204 is configured to communicate with the vehicle communication system 104 of the vehicle 100 via communication signals generally designated as 130. In embodiments, thresholds for sensed data from the sensors 110-1 through 110-N of the vehicle 100 are set and stored in the memory 106. When at least one sensor 110-1 through 110-N senses sensor data that reaches a set threshold, the controller crates an event-triggered report that is stored in a buffer 108 in the memory 106. In embodiments, the controller 102 is further configured to generate a summary indicator signal that is communicated through the vehicle communication system 104 to the base station communication system 204 of the base station 200. The summary indicator signal includes a summary of the then current event-triggered reports in the buffer 108. An example format of a summary indicator signal may include a message header, number of each type of buffered event-triggered report, size of each buffered event-triggered report, timestamp of each buffered event-triggered report, summary of each buffered event-triggered report, and a checksum. In an embodiment, the summary indicator signal is generated based upon a detected predetermined summary signal condition. In one embodiment, the predefined summary signal condition is based at least in part on a threshold relating to the number of event-triggered reports stored in the buffer. In another embodiment, the predefined summary signal condition is based at least in part on a threshold relating to the number of specific type of event-trigger reports stored in the buffer. Further yet, in another embodiment the predefined summary condition is based at least in part on a specific type of event-triggered report stored in the buffer. In yet still another embodiment, the predefined summary condition is based at least in part on a request from a base station.

The base station controller 202, based on instructions stored in the base station memory 206 in one embodiment, and the summary indicator signal determines if any of the event-triggered reports in the buffer 108 are needed. If at least one of the event-triggered reports is needed, the base station controller 202 instructs the base station communication system 204 to send a report needed signal to the vehicle communication system 104 of the vehicle 100 requesting the needed event-triggered reports be communicated to the base station 200. In response, the vehicle controller 102 directs the vehicle communication system 104 to transmit only those select event-triggered reports stored in the buffer 108 to the base station 200 that were requested. Using this method, only event-triggered reports that are needed are communicated between the vehicle 100 and the base station 200 to limit communication costs. Although, the base station is described as a ground station in the aviation realm, the base station may be any type of communication hub desiring access to the event-triggered reports stored in the buffer 108 of the vehicle 100. For example, the base station 200 in another embodiment, may be another aircraft or other communication hub remote to vehicle 100.

In the aviation realm, example data monitored by the sensors include turbulence data and weather data such as hail, lightening and reflectivity. Other sensor data may include data relating to the health and performance of the aircraft. Example logic used to determine event-triggered reports relating to turbulence data are eddy-dissipation rate (EDR) algorithm/software logic. For example, an event-triggered report may be generated if a peak EDR is greater than or equal to a first set value over a period of one minute. Another event-triggered report may be generated if the EDR is greater than or equal to a second set value for at least 3 out of the last 6 minutes. Yet another event-triggered report may be generated if the mean EDR is greater than or equal to a third value for at least 4 out of the last 6 minutes. In other realms, other type of sensor data may be monitored with associated threshold parameters determining when an event-triggered report is generated and stored in the buffer 108. Moreover, in one embodiment, all detected sensor data is stored in the buffer. In this embodiment, the sensor data that reaches a set threshold is marked so it can be easily be identified in the summary indicator signal. Moreover, in one embodiment, the base station is configured to send a threshold signal to the vehicle to select thresholds for sensor data detected by the sensors 110-1 through 110-N of the vehicle. This embodiment allows the base station 200 to determine at least in part what event-triggered reports are stored in the buffer 108 of the vehicle 100.

Figure 3:
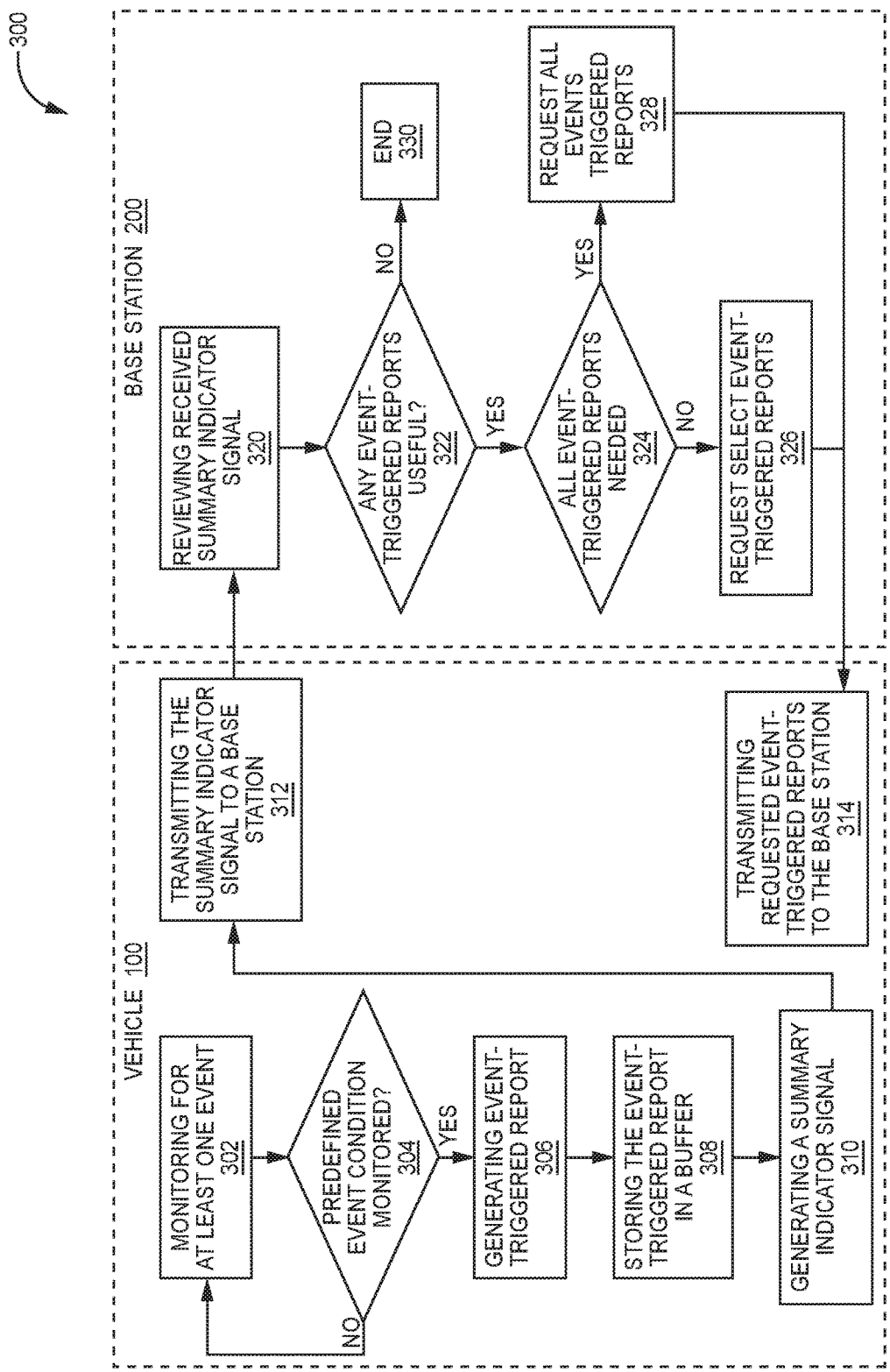
FIG. 3 is an event-triggered communication flow diagram of one embodiment of the present invention.

Referring to FIG. 3, an event-triggered communication flow diagram of one embodiment is illustrated. In this embodiment, the process begins by monitoring for at least one event with event sensors 110-1 through 110-N (302). It is then determined if a predefined event condition, such as monitored sensor data reaching a threshold, has been detected (304). If a predefined event condition has not been monitored at step (304), the process continues monitoring at step (302). Once a predetermined event condition is monitored at step (304), an event-triggered report is generated (306). The event-triggered report is then stored in buffer 108 (308). A summary indicator signal may then be generated indicating the contents of the buffer 108 (310). In embodiments, the summary indicator signal is generated when a predetermined summary signal condition is detected as discussed above. For example, in an embodiment, the summary indicator signal is generated at least in part after a specific amount of time has passed since the storing of an event-triggered report in the buffer 108. In another embodiment, the summary indicator is generated at least in part upon the detection of a select number of event-triggered reports being stored in the buffer 108. In further still another embodiment, a summary indicator signal is generated based at least at part on the detection of a select number of specific type of event-triggered reports being stored in the buffer 108. In further yet another embodiment the summary indicator signal is generated based at least in part on an external request such as, but not limited to, a request from the base station 200. In embodiments, the summary indicator signal includes information regarding each of the then current stored event-triggered reports that are in the buffer 108. In one embodiment, the summary report indicator signal includes information regarding the number of each type of event-triggered report and the size of each buffered event-triggered report. In yet another embodiment, the summary report indicator includes timestamps associated with each generated event-triggered report that indicates when the associated condition was monitored.

Once the summary indicator signal is generated at step (310), the summary indicator signal is transmitted to the base station 200 (312). At the base station 200, the received summary indicator signal is reviewed (320). The controller 202 of the base station 200 then determines if any event-triggered reports are useful based at least in part on the received summary indicator signal (322). If none of the event-triggered reports are useful at step (322), the process ends at step (330) until another received summary indicator signal is received at step (320). If it is determined that an event-triggered report is useful at step (322), it is then determined if all of the event-triggered reports are needed (324). If it is determined at step (324) that not all of the event-triggered reports are needed, the controller 202 of the base station generates a request that indicates only select event-triggered reports are needed (326). The request is then transmitted to the communication system 104 of the vehicle 100. If it is determined at step (324) that all event-triggered reports are needed, the controller 202 of the base station 200 generates a requests that all event-triggered reports are needed at step (328). In response to a request from the base station 200, the controller 102 of the vehicle 100 transmits the requested event-triggered reports to the base station 200 (314).

Figure 4:
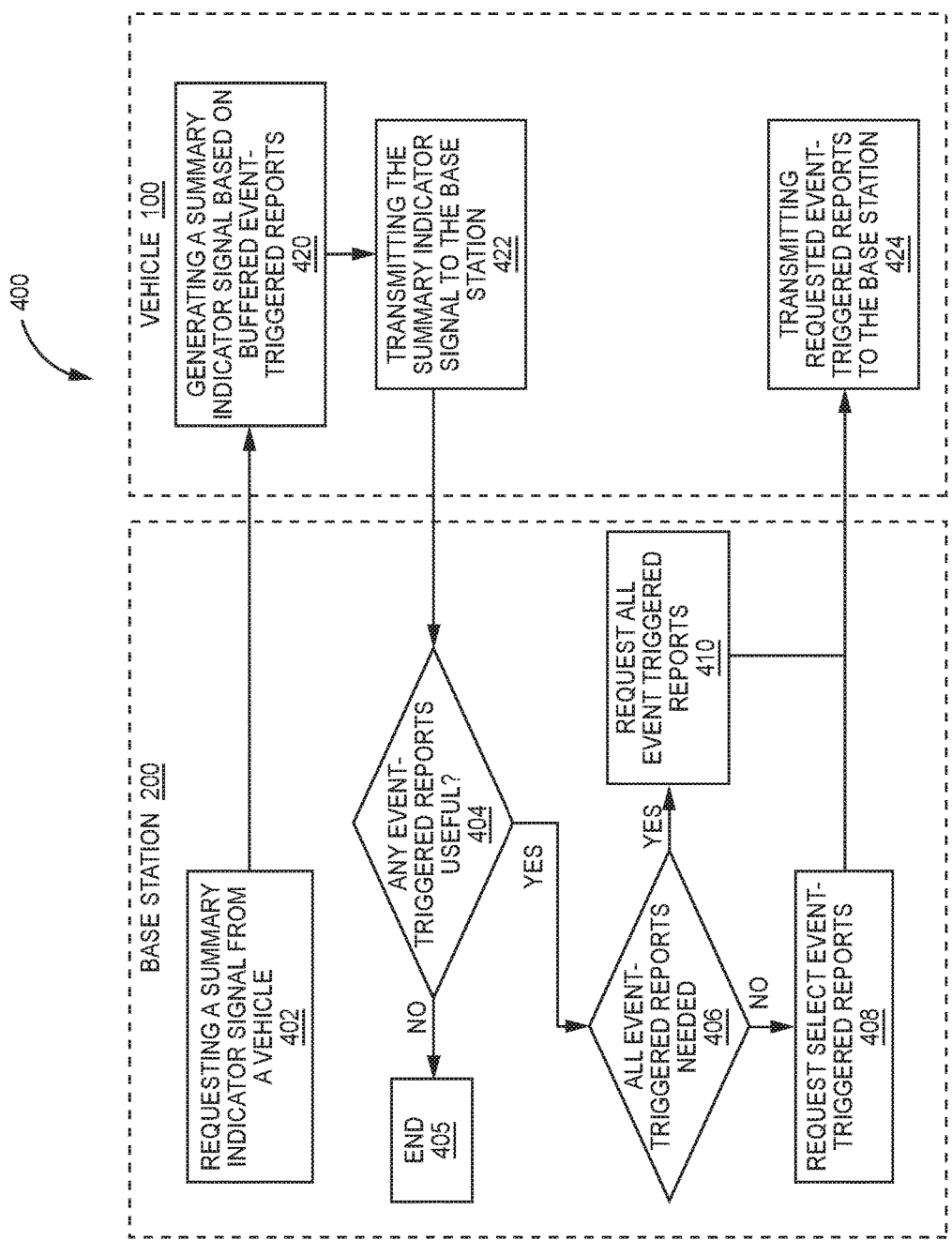
FIG. 4 is an event-triggered communication flow diagram of another embodiment of the present invention.

FIG. 4 is an event-triggered communication flow diagram of another embodiment. In this example embodiment, the base station 200 requests a summary indicator signal from the vehicle 100 (402). In response to the request, the vehicle 100 generates a summary indicator signal describing the event-triggered reports stored in the vehicle's buffer 108 (420). The summary indicator signal is then transmitted to the base station 200 via communication system 204 (422). The controller 202 of the base station 200 then determines if any of the event-triggered reports are useful based at least in part on the received summary indicator signal (404). If none of the event-triggered reports are determined useful at step (404), the process ends (405) until another request for summary indicator signal is sent from the base station at step (402). If at least some of the event-triggered reports are determined useful at step (404), is then determined if all of the event-triggered reports are needed in this embodiment (406). If only select number event-triggered reports are needed, only those select event-triggered reports are requested (408). If it is determined at step (406) that all event-triggered reports are needed, all of the event-triggered reports are requested (410). The vehicle 100 in response to the request from the base station 200 transmits only the requested event-triggered reports to the base station 200 (424).

EXAMPLE EMBODIMENTS

Example 1 includes a method of communicating event-triggered information, the method comprising: monitoring for events with a vehicle; generating an event-triggered report when a predefined event condition is monitored; storing the event-triggered report in a buffer of the vehicle; transmitting a summary indicator signal from the vehicle to a base station, the summary indicator signal indicating at least the number and types of event-triggered reports that are then currently stored in the buffer; receiving a request signal from the base station to transmit at least one select event-triggered report stored in the buffer of the vehicle; and in response to the request signal, transmitting the at least one select event-triggered report stored in the buffer of the vehicle to the base station.

Example 2 includes the method of Example 1, further comprising: generating the summary indicator signal upon detecting a predetermined summary signal condition, the predefined summary signal condition being at least one of a detected threshold relating to the number of event-triggered reports stored in the buffer, a detected threshold relating to the number of specific type of event-trigger reports stored in the buffer and a detected specific type of event-triggered report stored in the buffer.

Example 3 includes the method of any of Examples 1-2, wherein the summary indicator signal further includes an indication of the size of each event-triggered report stored in the buffer.

Example 4 includes the method of any of Examples 1-3, wherein the event-triggered report relates to one of monitored turbulence, monitored weather and monitored health and performance vehicle system data.

Example 5 includes the method of any of Examples 1-4, further comprising: time stamping the event-triggered report.

Example 6 includes the method of Example 5, wherein the summary indicator signal includes the time stamping information.

Example 7 includes the method of any of Examples 1-6, further comprising: from the summary indicator signal, determining if at least some of the event-trigger reports stored in the buffer are useful to the base station.

Example 8 includes the method of Example 7, further comprising: when it is determined that at least some of the event-trigger reports are useful, determining if all of the event-trigger reports are useful; if all the event-triggered reports are useful, requesting that the vehicle send all of the event-triggered reports to the ground station.

Example 9 includes the method of Example 8, further comprising: if all of the event-triggered reports are not useful, requesting only those event-triggered reports that are useful be sent from the vehicle buffer to the ground station.

Example 10 includes a method of reporting events, the method comprising: setting at least one defined threshold that warrants an event-generated report associated with sensor data from at least one sensor; monitoring the sensor data from the at least one sensor; upon detection of sensor data from the at least one sensor reaching the at least one defined threshold, generating an associated event-generated report; storing the event-generated report in a buffer; generating a summary indicator signal upon detection of a predetermined summary signal condition; transmitting the summary indicator signal to a remote location, the summary indicator signal including information indicating at least the number and types of event-triggered reports that are then currently stored in the buffer; and upon receiving a remote request in response to the summary indicator signal, transmitting only those event-triggered reports stored in the buffer requested in the remote request.

Example 11 includes the method of Example 10, wherein the predetermined summary signal condition relates at least in part to the detection of a select number of same type of event-generated reports stored in the buffer.

Example 12 includes the method of any of Examples 10, wherein the predetermined summary signal condition relates at least in part to the detection of a select amount of event-generated reports stored in the buffer.

Example 13 includes the method of any of Examples 10, wherein the predetermined summary signal condition relates at least in part to the detection of a select type of event-generated report stored in the buffer.

Example 14 includes the method Example 10-13, wherein each event-generated report further includes at least one of a date stamp and an indication of the size of the event-triggered report.

Example 15 includes the method of any of Examples 10-14, wherein the event-triggered report relates to one of monitored turbulence, monitored weather and monitored health and performance vehicle system data.

Example 16 includes an event-triggered vehicle reporting system comprising: a memory for storing at least operating instructions, the memory including a buffer; at least one sensor; a communication system; and a controller in communication with the at least one sensor, buffer and communication system, the controller configured to execute the operating instructions to generate event-triggered reports based on sensed data from the at least one sensor, the controller further configured to store each generated event-triggered report in the buffer of the memory, the controller further configured to generate a summary indicator signal that includes at least the number and types of event-triggered reports that are then currently stored in the buffer based at least in part on a predefined summary signal condition and cause the communication system to transmit the summary indicator signal to a remote location.

Example 17 includes the vehicle reporting system of Example 16, further comprising: the controller further configured to cause the communication system to transmit to the remote location requested event-triggered reports.

Example 18 includes the vehicle reporting system of any of Examples 16-17, wherein the controller is further configured to time stamp each event-triggered report and include said time stamp information in the summary indicator signal.

Example 19 includes the vehicle reporting system of any of Examples 16-18, wherein the controller is further configured to include an indication of the size of each event-triggered report stored in the buffer in the summary indicator signal.

Example 20 includes the vehicle reporting system of any of Examples 16-19, wherein the predefined summary signal condition is at least one of a detected threshold relating to the number of event-triggered reports stored in the buffer, a detected threshold relating to the number of specific type of event-trigger reports stored in the buffer and a detected specific type of event-triggered report stored in the buffer.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:
1. A method of communicating event-triggered information, the method comprising:
    monitoring for events with one or more sensors on a vehicle;
    generating an event-triggered report when a predefined event condition is monitored;
    storing the event-triggered report in a buffer of the vehicle;
    generating a summary indicator signal comprising a summary of event-triggered reports currently stored in the buffer, the summary indicator signal indicating at least the number and types of event-triggered reports that are then currently stored in the buffer;
    transmitting the summary indicator signal from the vehicle to a base station;
    receiving a request signal from the base station requesting only select needed event-triggered reports stored in the buffer of the vehicle based on the summary indicator signal; and
    in response to the request signal, transmitting only the requested select event-triggered reports stored in the buffer of the vehicle to the base station.
2. The method of claim 1, further comprising:
    generating the summary indicator signal upon detecting a predetermined summary signal condition, the predetermined summary signal condition being at least one of a detected threshold relating to the number of event-triggered reports stored in the buffer, a detected threshold relating to the number of specific type of event-triggered reports stored in the buffer and a detected specific type of event-triggered report stored in the buffer.

3. The method of claim 1, wherein the summary indicator signal further includes an indication of the size of each event-triggered report stored in the buffer.

4. The method of claim 1, wherein the event-triggered report relates to one of monitored turbulence, monitored weather and monitored health and performance vehicle system data.

5. The method of claim 1, further comprising:
time stamping the event-triggered report.

6. The method of claim 5, wherein the summary indicator signal includes the time stamping information.

7. The method of claim 1, further comprising:
from the summary indicator signal, determining if at least some of the event-trigger reports stored in the buffer are useful to the base station.

8. The method of claim 7, further comprising:
when it is determined that at least some of the event-trigger reports are useful, determining if all of the event-trigger reports are useful;
if all the event-triggered reports are useful, requesting that the vehicle send all of the event-triggered reports to the base station.

9. The method of claim 8, further comprising:
if all of the event-triggered reports are not useful, requesting only those event-triggered reports that are useful be sent from the vehicle buffer to the base station.

10. A method of reporting events, the method comprising:
setting at least one defined threshold that warrants an event-triggered report associated with sensor data from at least one sensor;
monitoring the sensor data from the at least one sensor;
upon detection of sensor data from the at least one sensor reaching the at least one defined threshold, generating an associated event-triggered report;
storing the event-triggered report in a buffer;
generating a summary indicator signal upon detection of a predetermined summary signal condition, the summary indicator signal summarizing stored event-triggered reports in the buffer and including information indicating at least the number and types of event-triggered reports that are then currently stored in the buffer;
transmitting the summary indicator signal to a remote location; and
upon receiving a remote request from the remote location requesting only select needed event-triggered reports based on the summary indicator signal, transmitting only the requested select event-triggered reports stored in the buffer to the remote location.

11. The method of claim 10, wherein the predetermined summary signal condition relates at least in part to the detection of a select number of same type of event-triggered reports stored in the buffer.

12. The method of claim 10, wherein the predetermined summary signal condition relates at least in part to the detection of a select amount of event-triggered reports stored in the buffer.

13. The method of claim 10, wherein the predetermined summary signal condition relates at least in part to the detection of a select type of event-triggered report stored in the buffer.

14. The method claim 10, wherein each event-triggered report further includes at least one of a date stamp and an indication of the size of the event-triggered report.

15. The method of claim 10, wherein the event-triggered report relates to one of monitored turbulence, monitored weather and monitored health and performance vehicle system data.

16. An event-triggered vehicle reporting system comprising:
a memory for storing at least operating instructions, the memory including a buffer;
at least one sensor;
a communication system; and
a controller in communication with the at least one sensor, buffer and communication system, the controller configured to execute the operating instructions to:
generate event-triggered reports based on sensed data from the at least one sensors;
store each generated event-triggered report in the buffer of the memory;
generate a summary indicator signal that includes a summary of event-triggered reports currently stored in the buffer, the summary indicator signal including at least the number and types of event-triggered reports that are then currently stored in the buffer based at least in part on a predefined summary signal condition; and
cause the communication system to transmit the summary indicator signal to a remote location;
receive a request signal from the remote location requesting only select needed event-triggered reports stored in the buffer of the vehicle based on the summary indicator signal; and
in response to the request signal, transmit only the requested select event-triggered reports stored in the buffer of the vehicle to the base station.

17. The vehicle reporting system of claim 16, wherein the controller is further configured to time stamp each event-triggered report and include said time stamp information in the summary indicator signal.

18. The vehicle reporting system of claim 16, wherein the controller is further configured to include an indication of the size of each event-triggered report stored in the buffer in the summary indicator signal.

19. The vehicle reporting system of claim 16, wherein the predefined summary signal condition is at least one of a detected threshold relating to the number of event-triggered reports stored in the buffer, a detected threshold relating to the number of specific type of event-trigger reports stored in the buffer and a detected specific type of event-triggered report stored in the buffer.

20. The vehicle reporting system of claim 16, wherein the event-triggered report relates to one of monitored turbulence, monitored weather and monitored health and performance vehicle system data.

* * * * *